United States Patent Office 3,423,421
Patented Jan. 21, 1969

---

3,423,421
SUBSTITUTED DIHYDRO-11H-ISOINDOLO[2,1-a]
BENZIMIDAZOL - 11 - ONES AND RELATED
COMPOUNDS
Theodore S. Sulkowski, Narberth, Pa., assignor to American Home Products Corporation, New York, N.Y., a corporation of Delaware
No Drawing. Continuation-in-part of application Ser. No. 336,615, Jan. 9, 1964. This application Feb. 1, 1966, Ser. No. 523,930
U.S. Cl. 260—309.2
Int. Cl. C07d 57/02
8 Claims

ABSTRACT OF THE DISCLOSURE

The reaction of 2-acylbenzoic acids, their lactols, or their lower alkyl esters, with an o-phenylenediamine results in the formation of a dihydro-11H-isoindolo[2,1-a]benzimidazol-11-ones. The thus obtained isoindolobenzimidazolones possess hypertensive, central nervous system depressant and antiinflammatory activities.

---

This is a continuation-in-part of application Ser. No. 336,615, filed on Jan. 9, 1964, now abandoned.

This invention relates to compositions of matter classified in the art of chemistry as substituted isoindolobenzimidazolones. More particularly, this invention relates to chemical compounds having molecular structures in which there is attached to the 4b-position of the dihydro-11H-isoindolo[2,1-a]benzimidazol-11-one nucleus a phenyl, methyl, or benzyl group or their hereinafter disclosed equivalents.

The novel compounds of the present invention possess the general physical properties of being relatively high melting crystalline solids and being substantially insoluble in water but soluble in polar solvents, such as lower aliphatic alcohols. Examination of these compounds by ultraviolet and infrared spectrographic analysis reveals spectral data confirming the molecular structures hereinbefore set forth. Thus the frequencies of the N—H and N—C=O are evident in the infrared spectra. The aforementioned physical characteristics, taken together with the nature of the starting materials and the mode of synthesis, positively confirm the structure of the compounds of this invention.

The manner and process of making and using the present invention will be hereinafter described so as to enable a person skilled in the art of chemistry to make and use the same. The preparation of the isoindolobenzimidazolone compounds of the present invention is illustrated schematically for a specific embodiment in Scheme A, below, and more generally in Scheme B.

SCHEME A

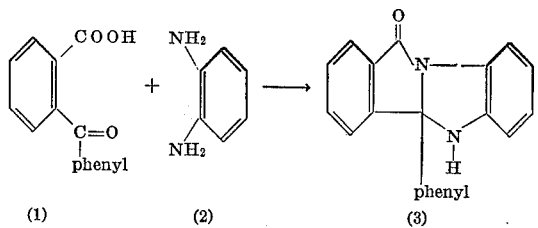

SCHEME B

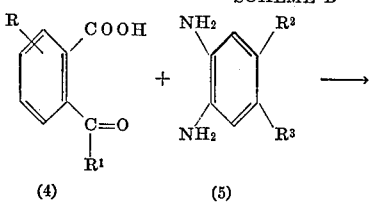

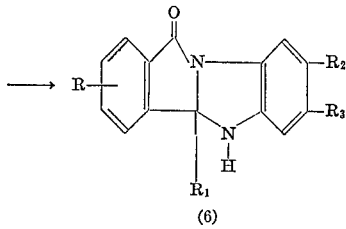

(6)

The isoindolobenzimidazolones of the present invention can be prepared by condensing a 2-acyl-benzoic acid (1) (4), its lactol form, or its lower alkyl ester, with an o-phenylenediamine (2) (5) to form the desired dihydro-11H-isoindolo[2,1-a]benzimidazol-11-one. This condensation is effected by refluxing the reactants in an inert solvent, preferably toluene, while continuously removing the water of reaction as it forms. Upon completion of the reaction, the reaction mixture is evaporated to a solid residue which is recrystallized from a lower alkanol solvent. The 2-acyl-benzoic acids and the o-phenylenediamines employed as starting materials are generally known or are readily prepared by procedures known to those skilled in the art.

It will be apparent to those skilled in the art of chemistry that the aforesaid condensation reaction can be carried out with any 2-acyl-benzoic acid and any o-phenylenediamine which are substituted with non-interfering groups. More specifically, there can be on any available position on the benzene rings of the acyl-benzoic acids, a substituent (Scheme B, R) such as for example but without limitation, a lower alkyl group including methyl, ethyl, propyl, butyl, pentyl and hexyl; a halo-(lower)alkyl group such as trifluoromethyl or dichloromethyl; a lower alkoxy group ranging from methoxy to pentoxy; a halogen such as chlorine or bromine; or a nitro group. Similarly, the substituent (Scheme B, $R_1$) on the carbonyl carbon, can be, for example but without limitation, a lower alkyl group as above defined; a (lower) aralkyl group such as benzyl or phenethyl; a phenyl group which can have thereon any of the R substituents above defined; or a 5- or 6-membered heterocyclic radical such as a 2- or 3-thienyl group, a pyridyl or a furyl radical. The o-phenylenediamine employed can have in the 4,5-positions (Scheme B, $R_2$, $R_3$) one or more halogen atoms such as a chlorine or bromine atom, instead of hydrogen. Obviously, when the starting compounds are substituted as hereinbefore indicated, it will be apparent to those skilled in the art that the isoindolobenzimidazolones produced thereby will bear correspondingly the same substituents. Such substituted compounds are the full equivalents of the invention as particularly claimed.

It is also apparent that the hydrogen atom in the 5-position of the compounds of the present invention can readily be acylated. These variations in the molecular structure of the compounds of this invention as hereinbefore described are considered equivalents of the subject matter particularly claimed.

The isoindolobenzimidazolones of the present invention have been found to produce qualitatively varying therapeutic effects, as evidenced by pharmacological evaluation according to standard procedures. In such evaluations these compounds have demonstrated hypertensive, central nervous system depressant and anti-inflammatory activities.

When the compounds of this invention are employed as hypertensives, central nervous system depressants and anti-inflammatory agents may be administered alone or in combination with pharmaceutically acceptable carriers, the proportion of which is determined by the solubility and chemical nature of the compound, chosen route of administration and standard pharmaceutical practice.

For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 20 mg. to about 200 mg. per day is most desirably employed in order to achieve effective results.

The following examples are given by way of illustration and are not to be construed as limitations of this invention, many variations of which are possible without departing from the scope and spirit thereof.

Example I

Reflux twelve grams of 2-benzoylbenzoic acid, 6 g. of o-phenylenediamine and 75 ml. of toluene for 16 hours in a flask equipped with a water separator. Evaporate the solution to dryness and recrystallize the solid residue from ethanol to obtain 4b-phenyl-4b,5-dihydro-11H-isoindolo-[2,1-a]benzimidazol-11-one, M.P. 185–7° C.

Reflux nine grams of 4b-phenyl-4b,5-dihydro-11H-isoindolo[2,1-a]benzimidazol-11-one and 50 ml. of acetic anhydride for 18 hours. Evaporate the solution to dryness and recrystallize the solid residue from ethanol to obtain 5 - acetyl - 4b - phenyl-4b,5-dihydro-11H-isoindolo[2,1-a] benzimidazol-11-one, M.P. 183–5° C.

Example II

Reflux ten grams of 2-benzoylbenzoic acid, 8 g. of 4,5-dichloro-o-phenylenediamine, and 100 ml. of toluene 16 hours in a flask equipped with a water separator. Evaporate the solution to dryness and recrystallize the solid residue from ethanol to obtain 7,8-dichloro-4b-phenyl-4b,5 - dihydro-11H-isoindolo[2,1-a]benzimidazol-11-one, M.P. 203–5° C.

Similarly, 7,8 - dibromo - 4b-phenethyl-4b,5-dihydro-11H-isoindolo[2,1-a]benzimidazol-11-one and 8-iodo-4b-(p - trifluoromethylphenyl) - 4b,5-dihydro-11H-isoindolo-[2,1-a]benzimidazol-11-one are produced.

Example III

Reflux thirteen grams of 2-(p-chlorobenzoyl)benzoic acid, 6 g. of o-phenylenediamine and 100 ml. of toluene 14 hours in a flask equipped with a water separator. Evaporate the solution to dryness and recrystallize the residue from ethanol to obtain 4b - (p - chlorophenyl)-4b,5-dihydro - 11H - isoindolo[2,1-a]benzimidazol-11-one, M.P. 162–4° C.

In a similar manner by reacting 2-(p-bromobenzoyl) benzoic acid with 4-bromo-o-phenylenediamine, there is obtained 7 - bromo - 4b - (p-bromophenyl)-4b,5-dihydro-11H-isoindolo[2,1-a]benzimidazole-11-one.

Example IV

Reflux nine grams of 2-(α-thenoyl)benzoic acid, 7 g. of o-phenylenediamine, and 100 ml. of toluene 6 hours in a flask equipped with a water separator. Evaporate the solution to dryness and recrystallize the solid residue from ethyl acetate to obtain 4b - (α-thienyl)4b,5-dihydro-11H-isoindolo[2,1-a]benzimidazol-11-one, M.P. 195° C.

Similarly, 4b - furyl - 2-nitro-4b,5-dihydro-11H-isoindolo[2,1 - a]benzimidazol - 11-one; 3-chloro-4b-pyridyl - 4b,5 - dihydro - 11H-isoindolo[2,1-a]benzimidazol-11 - one and 2 - dichloromethyl-4b-phenyl-4b,5-dihydro-11H - isoindolo[2,1-a]benzimidazol-11-one are produced.

Example V

Reflux ten grams of 2-acetylbenzoic acid, 4 g. of o-phenylenediamine, and 100 ml. of toluene 16 hours in a flask equipped with a water separator. Evaporate the solution to a solid residue. Recrystallize from ethanol to obtain 4b - methyl - 4b,5 - dihydro-11H-isoindolo[2,1-a] benzimidazol-11-one, M.P. 172–4° C.

In a similar manner, 2 - bromo-4b-ethyl-4b,5-dihydro-11H - isoindolo[2,1 - a]benzimidazol-11-one and 3-trifluoromethyl - 4b - propyl - 4b,5-dihydro-11H-isoindolo-[2,1-a]benzimidazol-11-one are synthesized.

Example VI

Reflux twelve grams of 3 - benzyl-3-hydroxyphthalide, 5 g. of o-phenylenediamine, and 100 ml. of toluene 18 hours in a flask equipped with a water separator. Evaporate the solution to a solid residue. Recrystallize from ethanol to obtain 4b-benzyl-4b,5-dihydro-11H-isoindolo-[2,1-a]benzimidazol-11-one, M.P. 165° C.

Similarly, the following compounds are prepared:

2 - methoxy - 4b - (p-nitrophenyl)4b,5-dihydro-11H-isoindolo[2,1-a]benzimidazol-11-one;

8 - iodo - 4b - phenyl - 4b,5 - dihydro-11H-isoindolo-[2,1-a]benzimidazol-11-one;

4b - (p - chlorophenyl)-3-propoxy-4b,5-dihydro-11H-isoindolo[2,1-a]benzimidazol-11-one; and 4b - (p - dichloromethylphenyl) - 4b,5-dihydro-11H-isoindolo[2,1-a]benzimidazol-11-one.

Example VII

The procedure described in Examples I to VI is repeated reacting the appropriate benzoic acids and o-phenylenediamines to produce the hereinafter listed isoindolobenzimidazalones.

*Isoindolobenzimidazolones*

3-methyl-4b-(p-tolyl)-4b,5-dihydro-11H-isoindolo[2,1-a] benzimidazol-11-one 2-ethyl-4b-phenyl-4b,5-dihydro-11H-isoindolo[2,1-a] benzimidazol-11-one 4b-benzyl-3-propyl-4b,5-dihydro-11-H-isoindolo[2,1-a] benzimidazol-11-one 4b-(p-ethylphenyl)-4b,5-dihydro-11H-isoindolo[2,1-a] benzimidazol-11-one

What is claimed is:

1. A compound selected from the group consisting of those having the formula:

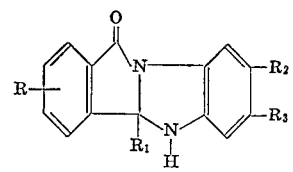

wherein R is selected from the group consisting of nitro, halogen, halo(lower)alkyl, lower alkoxy and lower alkyl;

$R_1$ is selected from the group consisting of lower alkyl, phen(lower)alkyl, phenyl, nitrophenyl, halophenyl, halo(lower)alkylphenyl, lower alkoxyphenyl, lower alkylphenyl, thienyl, pyridyl and furyl; and $R_2$ and $R_3$ are selected from the group consisting of hydrogen and halogen.

2. A compound as described in claim 1 which is: 4b-phenyl - 4b,5-dihydro-11H-isoindolo[2,1-a]benzimidazol-11-one.

3. A compound as described in claim 1 which is: 7,8-dichloro - 4b - phenyl-4b,5-dihydro-11H-isoindolo[2,1-a]benzimidazol-11-one.

4. A compound as described in claim 1 which is: 4b-(p - chlorophenyl) - 4b,5-dihydro-11H-isoindolo[2,1-a]benzimidazol-11-one.

5. A compound as described in claim 1 which is: 4b-(α - thienyl)-4b,5-dihydro-11H-isoindolo[2,1-a]benzimidazol-11-one.

6. A compound as described in claim 1 which is: 4b-methyl - 4b,5-dihydro-11H-isoindolo[2,1-a]benzimidazol-11-one.

7. A compound as described in claim 1 which is: 4b-benzyl - 4b,5-dihydro-11H-isoindolo[2,1-a]benzimidazol-11-one.

8. A compound as described in claim 1 which is: 5-acetyl - 4b - phenyl - 4b,5-dihydro-11H-isoindolo[2,1-a]benzimidazol-11-one.

References Cited

UNITED STATES PATENTS 3,108,108  10/1963  Schelhammer et al. __ 260—296

HENRY R. JILES, *Primary Examiner.*

A. L. ROTMAN, *Assistant Examiner.*

U.S. Cl. X.R.

260—517, 296, 999